W. B. WAIT.
Car Brake.
No. 21,038.
Patented July 27, 1858.
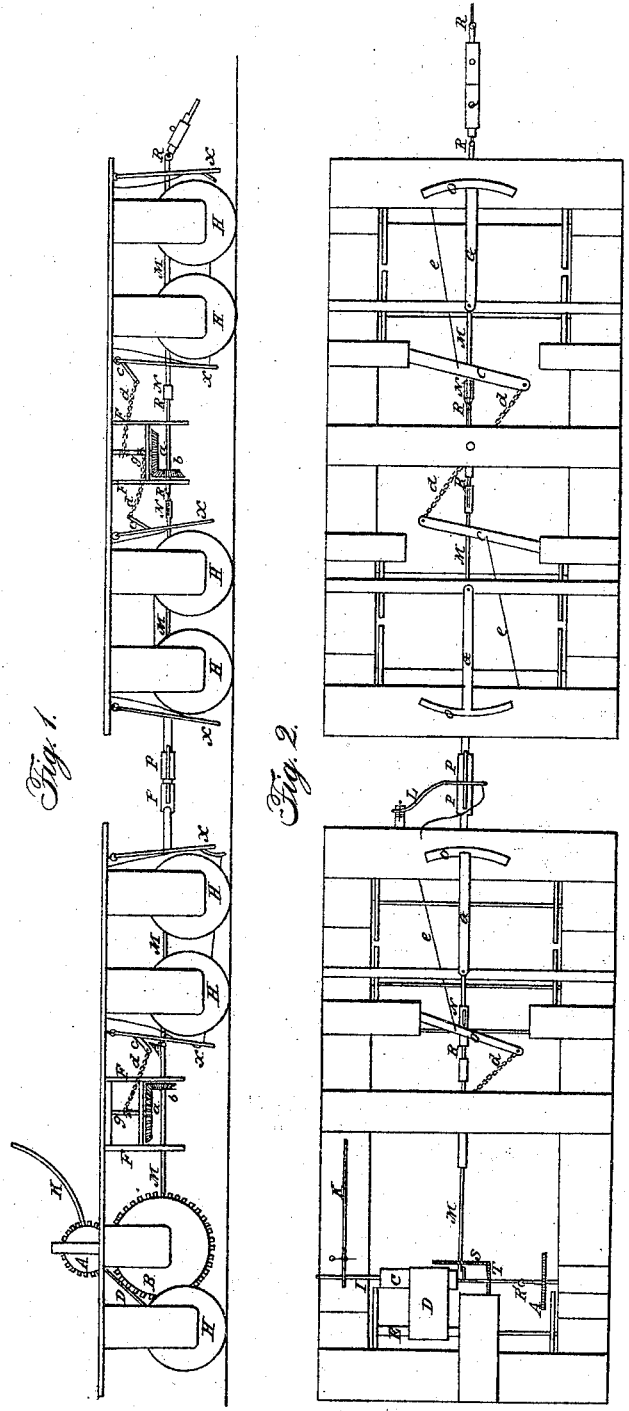
Witnesses:
Inventor:

UNITED STATES PATENT OFFICE.

W. B. WAIT, OF PORTSMOUTH, NEW HAMPSHIRE.

RAILROAD-CAR BRAKE.

Specification of Letters Patent No. 21,038, dated July 27, 1858.

*To all whom it may concern:*

Be it known that I, WILBUR B. WAIT, of Portsmouth, in the county of Rockingham and State of New Hampshire, have invented a new and Improved Mode for Braking-Up or Stopping Railroad-Cars when in Motion; and I do hereby declare that the following is a full, clear, and exact description of the construction and operation of the same, reference being had to the annexed drawings, making a part of this specification, in which—

Figure 1 represents a side view, and Fig. 2, a top view of the same.

The nature of my invention consists in providing a frame F, Fig. 1, under the central part of the platform of the tender or locomotive and each car, in which frame a perpendicular shaft, $g$, with cog-wheel, $a$, is erected and around which shaft the brake-chains, $d$, are wound by the action of the main shaft, M.

To my main shaft, M, I attach cog-wheels, S, Fig. 2, and $b$, Fig. 1, the former to be acted upon by the cog-wheel, T, Fig. 2, and the latter acting upon the cog-wheel, $a$, Fig. 1. My main-shaft, M, is so constructed with eyes, or links, R, and slots, N, Figs. 1 and 2, and connecting joints Q Q or P P with latch L attached, as to form a continuous shaft from the locomotive, tender, or car through two or more cars of a whole train. The brake-chains, $d$, I attach to arms or levers, $c$, Fig. 2, and from the latter I run connecting rods, $e$, Fig. 2, to the brakes, X, Fig. 1.

Upon the horizontal shaft, I, Fig. 2, I construct a drum, C, around which and the axle, E, the belt, D, runs. The shaft, I, is connected by an eye or link R', to the shaft and cog-wheel, A, Fig. 1, and can be so depressed by means of the lever, K, as to relieve the belt D, from any action of the axle E, or it may be so raised and graduated when the cars are in motion, as to draw upon the belt at pleasure and thereby operating upon the cogs A, B, T, S, and the main-shaft, M, and hence through upon the brakes, X, stop the speed or "rake-up" the car, or train of cars at the pleasure of the engineer or brakeman.

In the platform of each car, at either end, if needed I make a curved slot O, Fig. 2, for the guide bar G, to control the main-shaft M, in case either car should swing a little from the center.

In order to "brake-up" one or more cars of a train, it is only necessary for the engineer or brakeman to raise the shaft I, by means of the lever K, so as to draw upon the belt D, and hence all necessary power is acquired from the revolution of the axle E; or in case said belt and power is not needed the engineer or brakeman may "brake-up" one or more cars by simply turning the cog-wheel R, by hand as may be desired.

I do not claim the use of brake-chains and connecting brake-rods, as the same are now generally applied to car brakes, but what I claim as my invention and desire to secure by Letters Patent is—

The combination and arrangement of the frame F, together with the connecting joints Q Q, or P P with latch attached L, the shaft I with drum C, attached connecting with the shaft A by an eye R', the belt D passing around the axle E, the lever K, the levers or arms $c$ with brake-chains $d$ and rods E attached, the guide bar G and slot O, the main shafts M, A, and $q$, with cog-wheels attached thereto, and the slots N and eyes or links R and R', in the manner substantially as shown in Figs. 1 and 2 and as herein described.

WILBUR B. WAIT.

Witnesses:
BARTLETT CLAGGETT,
N. EDGAR WALKER.